Oct. 10, 1967 S. W. FURNESS ET AL 3,346,180
RECORDING DEVICES
Filed July 22, 1966
3 Sheets-Sheet 1

INVENTORS:
STANLEY WILLIAM FURNESS
LIONEL ERNEST HARD
By: Nolte & Nolte
ATTORNEYS INVENTORS:
STANLEY WILLIAM FURNESS
LIONEL ERNEST HARD
By: Nolte & Nolte
ATTORNEYS

INVENTORS
STANLEY WILLIAM FURNESS
LIONEL ERNEST HARD

United States Patent Office 3,346,180
Patented Oct. 10, 1967

3,346,180
RECORDING DEVICES

Stanley William Furness, 79 Beresford Road, Chingford, E. 4, London, and Lionel Ernest Hard, 28 Cheyne Close, Ware, England Filed July 22, 1966, Ser. No. 567,145
Claims priority, application Great Britain, Sept. 3, 1965, 37,737/65
4 Claims. (Cl. 235—74)

ABSTRACT OF THE DISCLOSURE

A corrosion resistant recording device for recording game scores having a housing, score symbol carrying elements and manually operable positive-stop drive all assembled without requiring any subsidiary fastening operation.

The invention relates to score recording devices, and more particularly, but not exclusively, to such devices for recording golf scores.

In one aspect, the present invention provides a score recording device, comprising in combination a base member defining a substantially planar base surface, a plurality of pairs of bearing posts formed integrally with said base member and upstanding from said base surface, a corresponding plurality of pairs of adjacent annular score symbol carrying elements mounted for rotation on said bearing posts, the periphery of each score symbol carrying element of each pair projecting beyond the periphery of the base member and having equiangularly spaced projections thereon, a corresponding plurality of corrosion resistant leaf springs each mounted in bridging relation between the peripheries of a pair of score symbol carrying elements, spring reaction means mounted on said base member and biasing said leaf springs towards said corresponding pairs of score symbol carrying elements for stabilizing said elements in positions in which two of said projections on each element engage with said leaf spring, and a cover member overlying said score symbol carrying elements and secured to said base member, said cover member being apertured to define pairs of adjacent windows overlying the paths of movement of the score symbols on a corresponding pair of score symbol carrying elements.

The present invention has been developed for use primarily as a golf scorer and will be more fully described by way of example with reference to the accompanying drawings which show an embodiment comprising a golf scorer.

Figure 1:
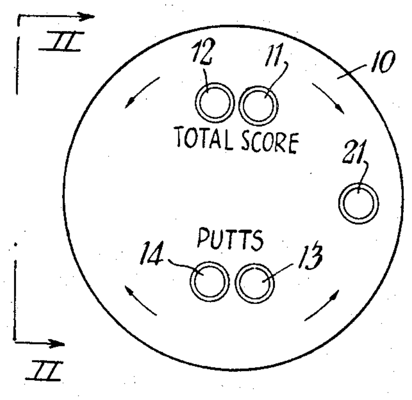
FIGURE 1 is a plan view of an upper casing part.
Figure 2:
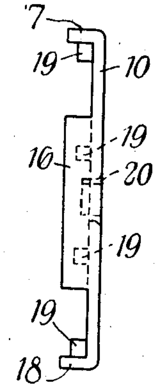
FIGURE 2 is a side elevation on the line II—II of FIGURE 1.
Figure 3:
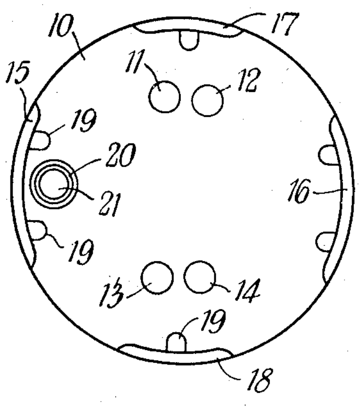
FIGURE 3 is an under plan view of the upper casing part shown in FIGURE 1.

Referring to the drawings, the upper casing part of FIGURES 1, 2 and 3 comprises a flat circular disc base part 10 apertured to provide two pairs of diametrically opposed windows 11, 12 and 13, 14. On the underneath face, the periphery of the base part 10 extends into four rim portions 15–18 arranged in opposed pairs, as shown. The rim portions 15, 16 are of longer circumferential extent than 17, 18; and the former are each provided with a pair of projections 19 extending inwardly of and connected to the base 10, while the latter rim portions are each provided with one such projection 19. It will be noted that projections 19 extend from the base 10 to a lesser height than the associated rim portions, like elements extending to respectively common heights as is the case for other elements hereinafter.

Lastly, the base 10 is provided with an annular extension 20 from its underneath face intermediate the projections 19 from rim portion 15. This extension 20 is of lesser height than projections 19, and its bore is continued through the base 10 to provide a fifth aperture 21.

Figure 4:
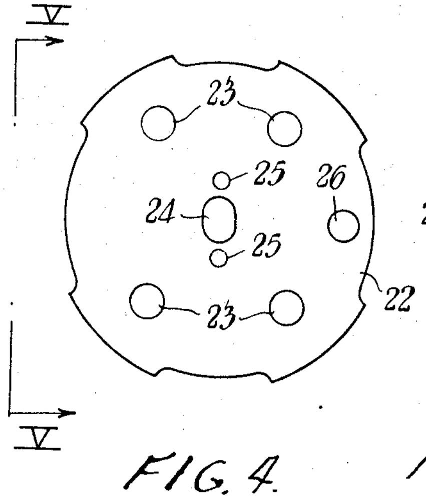
FIGURE 4 is a plan view of a lower casing part.
Figure 5:
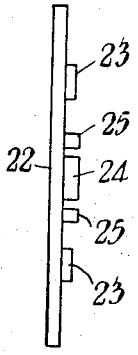
FIGURE 5 is a side elevation on the line V—V of FIGURE 4.
Figure 6:
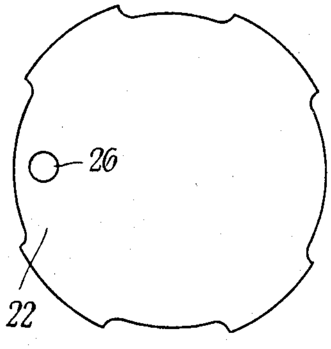
FIGURE 6 is an under plan view of the lower casing part shown in FIGURE 4.

The lower casing part of FIGURES 4, 5 and 6 has a generally flat circular disc base part 22, the diameter of which equals that of the upper casing base part 10. However, base part 22 is not exactly circular, for its periphery is recessed to complement the rim portions 15–18 of the upper casing base part 10.

The base part 22 also has projections from its upper face in the form of four bearing posts 23, and a spring reaction post 24 flanked by a pair of opposed spring retainers 25, as shown. The base part 22 is additionally apertured at 26 to reflect the bore 21 in the upper casing part.

Figure 7:
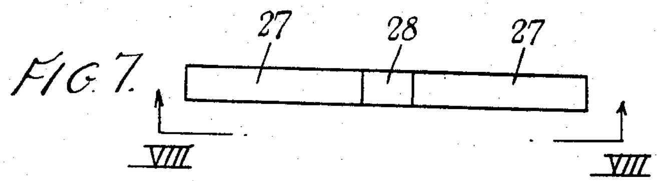
FIGURE 7 illustrates a spring in plan view.
Figure 8:
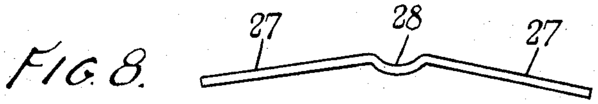
FIGURE 8 is a side elevation on the line VIII—VIII of FIGURE 7.

The spring of FIGURES 7 and 8 is produced from flat strip bent to slightly off-flat form with leaves 27 connected in generally V-shape through a central U-portion 28.

Figure 9:
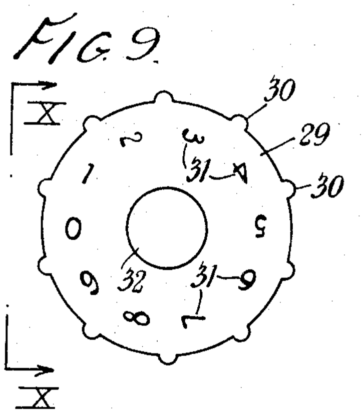
FIGURE 9 is a plan view of a score symbol carrying element.
Figure 10:
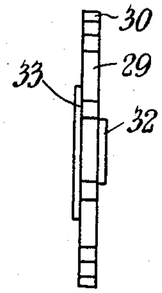
FIGURE 10 is a side elevation on the line X—X of FIGURE 9.
Figure 11:
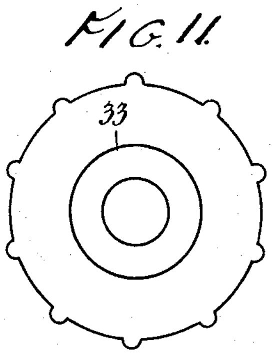
FIGURE 11 is an under plan view of the element shown in FIGURE 9.

FIGURES 9, 10 and 11 illustrate the form of the last remaining component part which comprises a flat circular disc base part 29 provided with ten radial projections or pips 30 equally spaced around its periphery, and score symbols 31 in the form of the numerals "0" to "9" spaced sequentially around the base upper surface, one numeral between each successive pair of pips. On its upper face the base part 29 is additionally provided with a central spacer projection 32, while on its underneath face it has a control bearing socket projection 33 of annular form.

Figure 13:
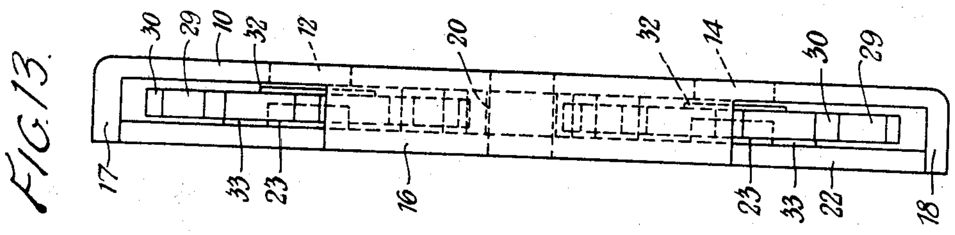
FIGURE 13 is a side elevation on the line XIII—XIII of FIGURE 12.
Figure 12:
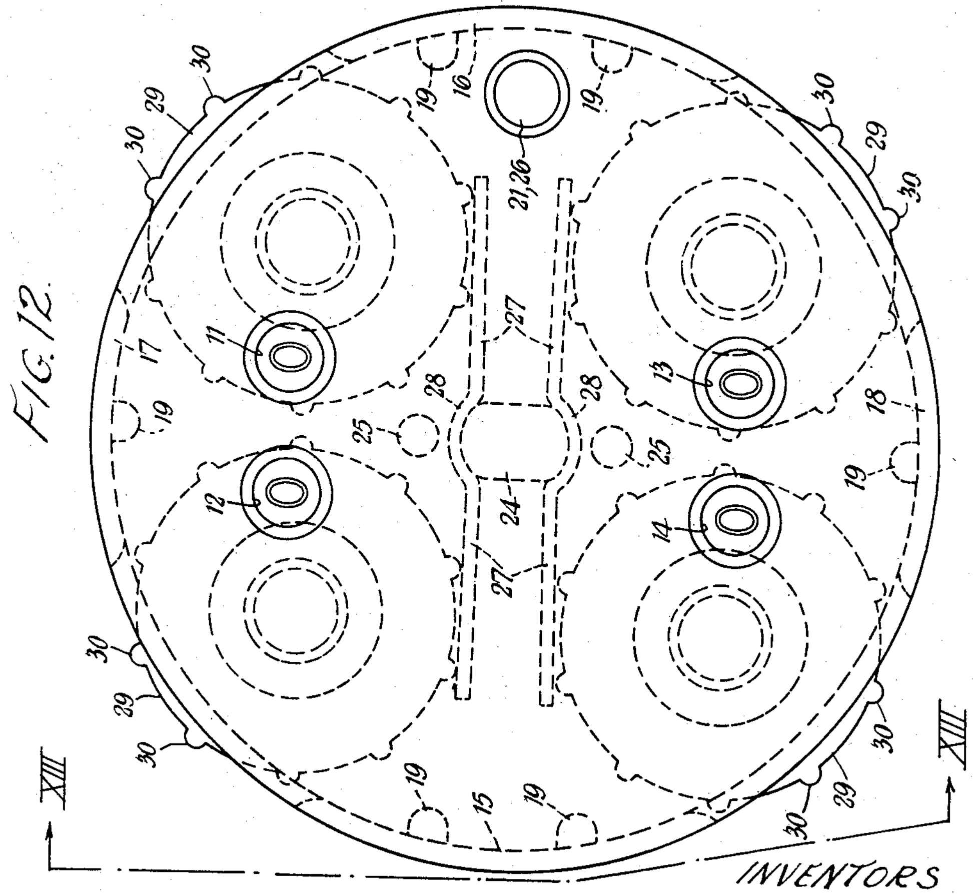
FIGURE 12 illustrates the complete golf scorer in plan view as assembled.

The above described components of FIGURES 1 to 11 are relatively dimensioned and shaped for assembly as indicated by FIGURES 12 and 13. Thus, starting with the lower casing of FIGURES 4, 5 and 6, two springs as shown in FIGURES 7 and 8 are located one each with their U-portions 28 located between the opposite ends of the spring reaction post 24 and respectively different ones of the spring retainers 25. Four symbol carrying elements, each as shown in FIGURES 9 to 11, are each located on a bearing post 23 by means of their respective bearing sockets 33. The upper casing part, as shown in FIGURES 1 to 3, is seated on the projections 19 with peripheral recesses and rim portions of the respective casing parts interlocked.

The resultant assembly is such that each symbol carrying element normally rests in a position with a pair of its pips 30 in positive-stop engagement with the corresponding spring leaf 27 urged thereagainst, while at the same time, another pair of its pips 30 project through the respective side wall opening of the casing between the interlocked rim portions and recesses, and one of its symbols is exposed by the respective one of the windows 11–14. The pips 30 then have a double function as second positive-stop elements relative to a spring leaf as a first positive-stop element, and also project as manually operable drive elements for the symbol carrying elements themselves. The arrangement is such that sequential drive of a symbol carrying element from one positive-stop engaged position with its spring leaf to another will be accompanied by sequential exposure of the respective symbols 31 and provide access to the pips in sequence to effect the drive itself.

It will be appreciated that the disposition of symbol sets on the symbol carrying elements may need to be varied from one element to another if the symbols are to be exposed in predetermined viewing relationship. Normally, it will be preferred for ease of viewing that all symbols be aligned when exposed. This is effected in the above embodiment by employing elements of the kind shown in FIGURES 9, 10 and 11 form in association with windows 11 and 13, but those for windows 12 and 14 will have their symbols 31 in reverse sequence to that shown in FIGURE 9.

Regarding actual manufacture, all parts other than the springs of the illustrated embodiment can conveniently be produced as mouldings from plastics materials, such as high impact polystyrene, while the springs can be suitably made from Phosphor bronze. Naturally, a wide range of materials can be employed, but those more particularly indicated are such as to produce a device having a long useful life, requiring no maintenance such as lubrication, and which is virtually unaffected by weather, this latter point being of some relevance to the application in question as a golf scorer.

In use as a golf scorer, the two window pairs are appropriate in that the symbol carrying elements associated with one pair can be operated to expose a total course score during play, while the other elements can be operated to expose a total score of putts, say. In each case, one element can be operated to represent the units part of a score, and the other to represent the tens part of the score, so giving maximum possible totals of "99." This is the proposed more usual likely use of the scorer for an individual golfer and the window pairs may be correspondingly labelled on the outer surface of the casing for this purpose. However, the scorer could equally well be used to represent the respective course scores during play of two golfers at the different pairs of windows.

Naturally, it is not intended that use of a recorder device according to the present invention be limited in this way and it will be clear that the device can find useful application in connection with recording the scores in various games, or indeed recording for other purposes. By the same token, the device is not intended to be limited to the above more particularly described embodiment, and the embodiment in question may itself be modified, or other embodiments may be readily produced to suit different requirements as to recording capacity and apportionment.

For example, regarding modification of the above embodiment: the positive-stop and drive arrangements can be changed without departing from the scope of the invention. While two pips are used in connection with positive-stop engagement, only one need be concerned if a suitably notched spring arrangement is employed. Also, the resilience employed in the positive-stop arrangement need not be provided by way of a leaf spring as shown, but the pips themselves may be resilient for this purpose in connection with a substantially rigid first positive-stop element. Again, use of the pips in a dual role may be replaced by use of separate function elements: thus, there may be use of separate drive elements wholly outside the casing coupled to symbol carrying elements wholly enclosed by the casing apart from the windows. A further possible variation would be to arrange each "tens" symbol carrying element for automatic stepping operation from the respective units element by the provision of a suitable radial projection from the latter to engage and drive the pips of the former by one "tens" step under the control of a "units" step movement from "0" to "9."

As to other variations within the scope of the invention for different recording purposes: clearly, the number of symbol carrying elements may be less or greater than that of the above embodiment, while the distribution of such elements and their respective casing apertures may also be varied at choice in manufacture.

What is claimed is:

1. A score recording device, comprising in combination a base member defining a substantially planar base surface, a plurality of pairs of bearing posts formed integrally with said base member and upstanding from said base surface, a corresponding plurality of pairs of adjacent annular score symbol carrying elements mounted for rotation on said bearing posts, the periphery of each score symbol carrying element of each pair projecting beyond the periphery of the base member and having equi-angularly spaced projections thereon, a corresponding plurality of corrosion resistant leaf springs each mounted in bridging relation between the peripheries of a pair of score symbol carrying elements, spring reaction means mounted on said base member and biasing said leaf springs towards said corresponding pairs of score symbol carrying elements for stabilising said elements in positions in which two of said projections on each element engage with said leaf spring, and a cover member overlying said score symbol carrying elements and secured to said base member, said cover member being apertured to define pairs of adjacent windows overlying the paths of movement of the score symbols on a corresponding pair of score symbol carrying elements.

2. A score recording device as claimed in claim 1, wherein the leaf springs are each made of phosphor-bronze.

3. A score recording device as claimed in claim 2, wherein the base and cover members are moulded from corrosion resistant material.

4. A score recording device comprising in combination a base member moulded from corrosion resistant material and defining a substantially planar base surface, two pairs of bearing posts moulded integrally with said base member from corrosion resistant material and upstanding from said base surface, two pairs of adjacent annular score symbol carrying elements each defining a bearing surface, said elements being mounted for rotation on said bearing posts and the periphery of each score symbol carrying element projecting beyond the periphery of the base member and having equi-angularly spaced projections thereon, a spring reaction post moulded integrally with said base member from corrosion resistant material, two phosphor-bronze leaf springs, each leaf spring being mounted between the peripheries of a pair of score symbol carrying elements and engaging at a point intermediate its ends with said spring reaction post for stabilising said score symbol carrying elements in positions in which two of said projections of each element engage with a leaf spring, a cover member moulded from corrosion resistant material and overlying said score symbol carrying elements, said cover member including depending side walls extending into engagement with said base member at positions intermediate the positions at which said score symbol carrying element peripheries extend beyond the periphery of the base member, said cover member being secured to said base member and being apertured to define two pairs of adjacent windows overlying the paths of movement of the score symbols on a corresponding pair of score symbol carrying elements.

References Cited

UNITED STATES PATENTS

| | | | |
|---|---|---|---|
| 1,119,256 | 12/1914 | Eaton | 235—74 |
| 1,614,850 | 1/1927 | O'Shea | 235—114 |
| 1,785,288 | 12/1930 | Swarthout | 235—114 |
| 2,167,271 | 7/1939 | Bowzer | 235—114 |
| 2,474,432 | 6/1949 | Lowe | 235—114 |
| 2,797,871 | 7/1957 | Murphy et al. | 235—113 |
| 2,838,238 | 6/1958 | Menes | 235—113 |

RICHARD B. WILKINSON, *Primary Examiner.*

STANLEY A. WAL, *Assistant Examiner.*